(12) United States Patent
Kim et al.

(10) Patent No.: US 11,995,198 B1
(45) Date of Patent: May 28, 2024

(54) METHOD OF PROVIDING PERSONAL DATA STORAGE SERVICE BETWEEN A FIRST USER WHO IS A DATA PROVIDER AND A SECOND USER WHO IS A DATA REQUESTER BY USING SMART CONTRACT BASED ON FIRST LAYER AND PRIVACY LAYER AND STORAGE LAYER BASED ON SECOND LAYER, AND STORAGE NODE USING THE SAME

(71) Applicant: PARAMETA Corp., Seoul (KR)

(72) Inventors: Jong Hyup Kim, Seongnam-si (KR); Hyeok Gon Ryu, Seongnam-si (KR); Byeongkil Sohn, Seongnam-si (KR); Heyrim Kim, Seoul (KR); Seungmin Ryu, Gwacheon-si (KR); Sungyub Na, Seoul (KR)

(73) Assignee: PARAMETA CORP., Seoul (KR)

( * ) Notice: Subject to any disclaimer, the term of this patent is extended or adjusted under 35 U.S.C. 154(b) by 0 days.

(21) Appl. No.: 18/510,362

(22) Filed: Nov. 15, 2023

(30) Foreign Application Priority Data

Sep. 27, 2023 (KR) .......................... 10-2023-0130162

(51) Int. Cl.
*G06F 21/60* (2013.01)
*G06F 21/62* (2013.01)

(52) U.S. Cl.
CPC .......... *G06F 21/602* (2013.01); *G06F 21/604* (2013.01); *G06F 21/6227* (2013.01)

(58) Field of Classification Search
CPC ... G06F 21/602; G06F 21/604; G06F 21/6227
See application file for complete search history.

(56) References Cited

U.S. PATENT DOCUMENTS

| 11,522,704 B1* | 12/2022 | Nasirov | ............... G06F 21/6218 |
| 2023/0239154 A1* | 7/2023 | Ali | ....................... H04L 63/0435 |
| | | | 713/168 |
| 2023/0421370 A1* | 12/2023 | Zhang | ................... H04L 9/0836 |

* cited by examiner

*Primary Examiner* — Philip J Chea
*Assistant Examiner* — Sangseok Park
(74) *Attorney, Agent, or Firm* — Thompson Patent Law Offices PC

(57) ABSTRACT

A method for providing a personal data storage service between a first user who is a data provider and a second user who is a data requester by using a smart contract based on a first layer and a privacy layer and a storage layer based on a second layer is provided. The method has an effect of generating encoded subject data made by encoding subject data by using a random key as an encryption key generated through a data provider terminal, to thereby prevent the personal storage service provider from decoding the subject data. Further, the method has another effect of saving the storage for use in PDS service, since there is no need to generate each of encoded encryption key and encoded subject data in line with each of data requester even if the number of data requesters increase by implementing using a proxy re-encryption technology.

20 Claims, 4 Drawing Sheets

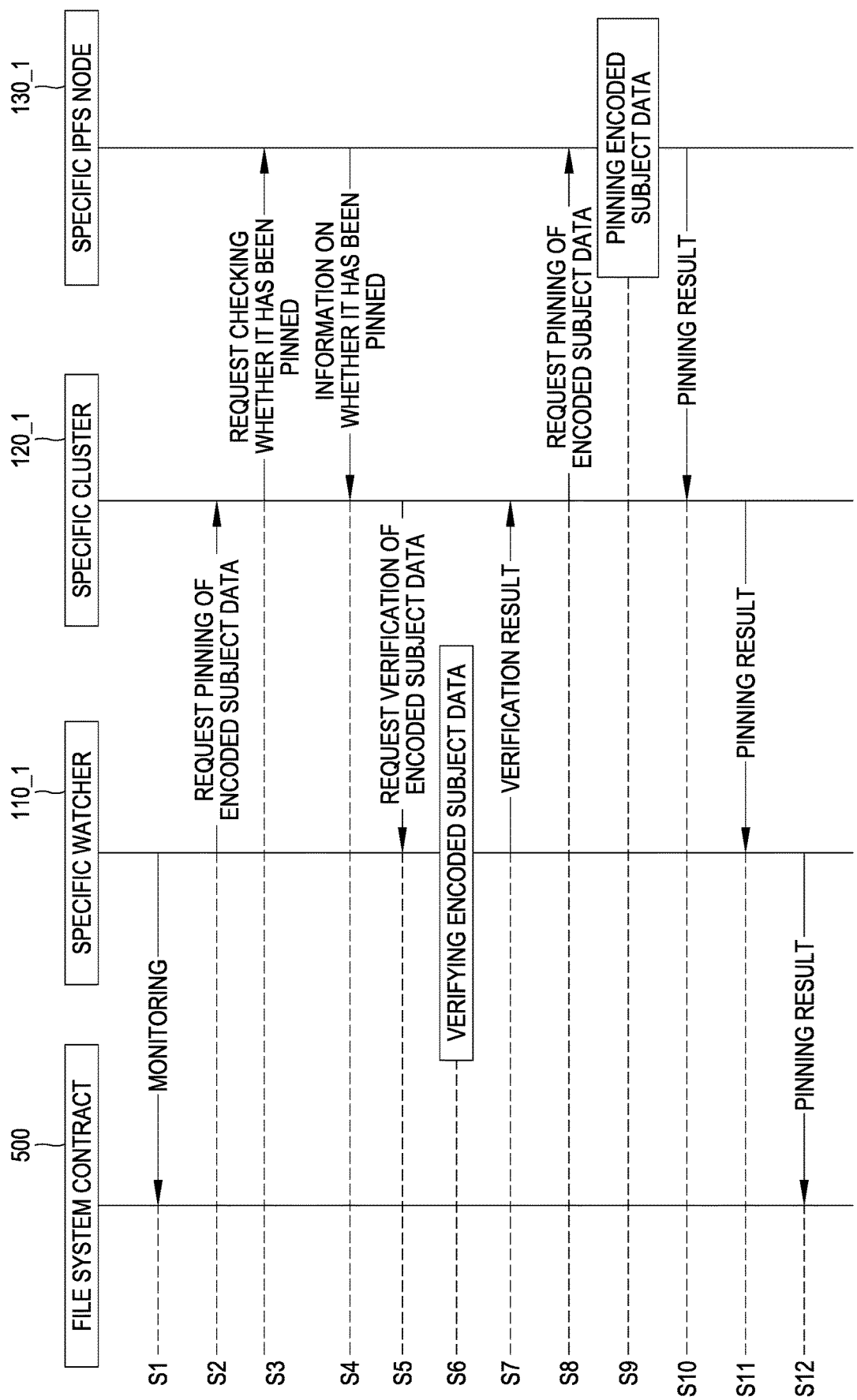

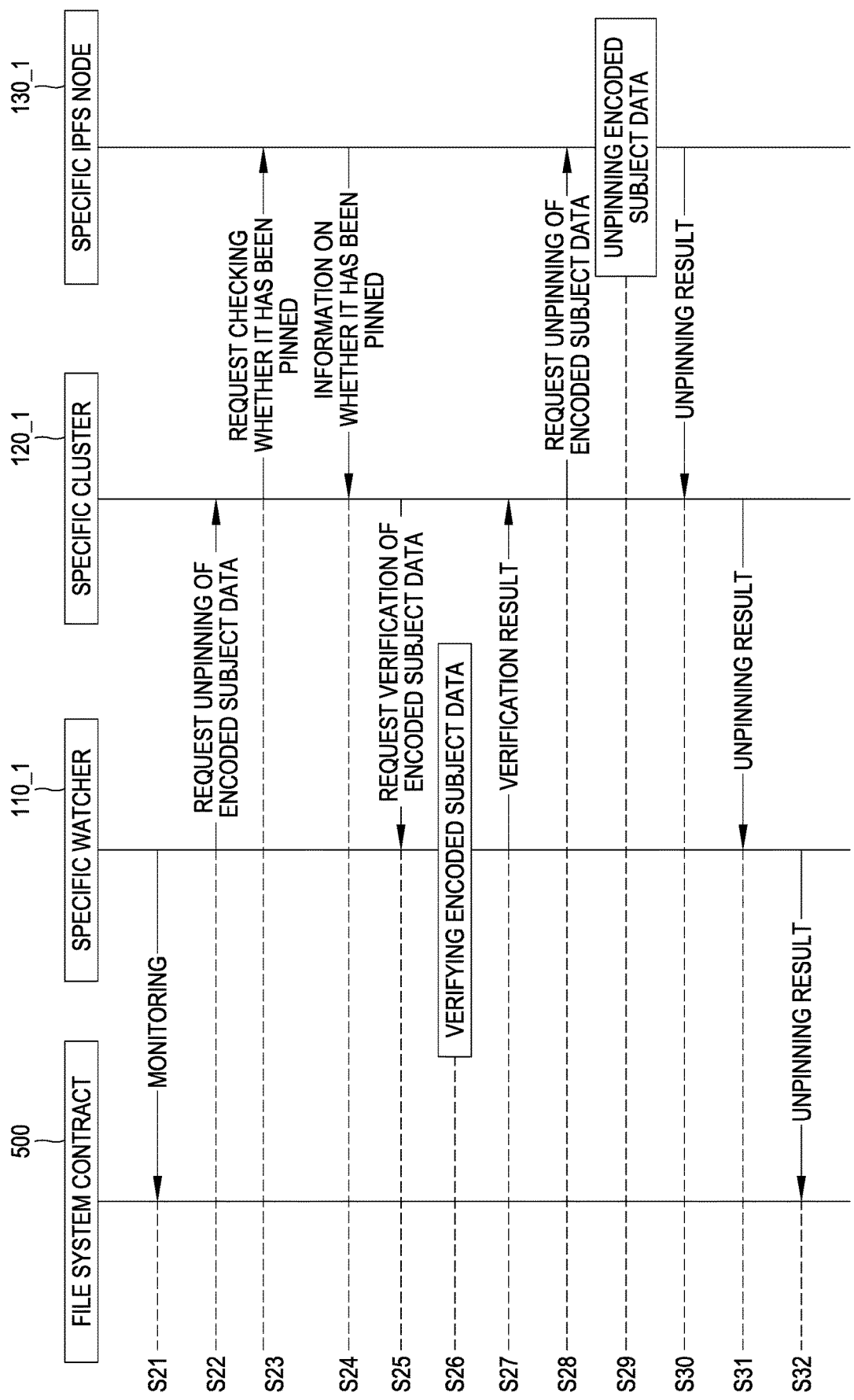

METHOD OF PROVIDING PERSONAL DATA STORAGE SERVICE BETWEEN A FIRST USER WHO IS A DATA PROVIDER AND A SECOND USER WHO IS A DATA REQUESTER BY USING SMART CONTRACT BASED ON FIRST LAYER AND PRIVACY LAYER AND STORAGE LAYER BASED ON SECOND LAYER, AND STORAGE NODE USING THE SAME

CROSS REFERENCE OF RELATED APPLICATION

This present application claims the benefit of the earlier filing date of Korean patent application No. 10-2023-0130162, filed on Sep. 27, 2023, the entire contents of which being incorporated herein by reference.

FIELD OF THE DISCLOSURE

The present disclosure relates to a method of providing personal data storage service between a first user who is a data provider and a second user who is a data requester by using a smart contract based on a first layer and a privacy layer and a storage layer based on a second layer, and a storage node using the same.

BACKGROUND OF THE DISCLOSURE

Conventionally, users may usually utilize centralized storages such as cloud computing services in order to store various data, e.g., sound sources, images, videos, or documents, but there is a problem that all the stored data may be lost when a certain problem arises in a cloud service provider or a cloud server.

To resolve the problem above, an advance technology has been studied and developed. The advanced technology such as a blockchain technology can allow various data to be stored in blocks in a distributed manner based on P2P configuration, to thereby prevent falsification of the data based on a distribution computing technology, but there is a limit in a storage capacity to be used for storing all the data belonging to all the users through a blockchain network(s), and there is an additional problem that the larger the size of the data is, the greater the fees (that is, gases) to be paid for transactions of the data are.

Accordingly, in case of an NFT service which is a typical service using the blockchain network, only pieces of information related to evidences on data such as smart contracts and token IDs are stored in the blockchain network (that is, main net), and digital contents which are as subject data to be used for issuing NFT metadata and NFTs are stored and managed in a storage located outside the blockchain network, but there is still a problem that the stored data may be lost when a problem arises in the storage concerned.

Accordingly, in order to prevent the data stored in the storage associated with the blockchain network from being leaked, an advanced storage service such as the personal data storage (PDS) service with a secured security of data was proposed.

According to the conventional PDS service for preventing an access of an unqualified user to personal data, on condition that a data provider has encoded the personal data and has uploaded the encoded personal data on the cloud storage, in response to acquiring an access request for the encoded personal data by a data requester, the data provider may (i) acquire a public key of the data requester upon a verification for the data requester, (ii) applies the public key of the data requester to an encryption key (which was used for encoding the personal data) to thereby generate an encoded encryption key and then uploads the encoded encryption key in the cloud storage to thereby allow an access of the data requester, (iii) allow the data requester to acquire the encoded personal data and the encoded encryption key through the cloud storage, and (iv) allow the data requester to acquire the encryption key by using a private key of the data requester and to acquire the personal data by decoding the encoded personal data with the encryption key.

However, as the number of data requesters who request the access for various personal data increases, the conventional PDS service should manage each of encoding keys corresponding to each of the personal data for each of the data requesters, and thus much more storage capacities should be prepared, which is not efficient.

In addition, because the encryption key to be used for encoding the personal data has been provided by the PDS service provider (that is, a cloud storage service provider), or because the encryption key with an encoded state is stored and managed in the cloud storage by the PDS service provider, the personal data can be decoded by the PDS service provider any time, which results in a problem in security.

Therefore, an enhanced method for solving the aforementioned problems is required.

SUMMARY OF THE DISCLOSURE

It is an object of the present disclosure to solve all the aforementioned problems.

It is another object of the present disclosure to generate encoded subject data by encoding subject data with a random key as an encryption key generated through a data provider terminal, to thereby prevent a personal storage service provider from decoding the encoded subject data.

It is still another object of the present disclosure to save a storage for use in the PDS service since there is no need to generate each of encoded encryption keys and each of encoded subject data for each of data requesters by using a proxy re-encryption technology even if the number of the data requesters increases.

It is still yet another object of the present disclosure to secure an availability of the subject data even if a problem occurs in some storage node(s) by recording each of copies of the encoded subject data in each of storage nodes included in a storage layer and then by instructing each of the storage nodes to record each of the copies of the encoded subject data in a distributed manner by chunking.

In accordance with one aspect of the present disclosure, there is provided a method for providing a personal data storage service between a first user who is a data provider and a second user who is a data requester by using a smart contract based on a first layer and a privacy layer and a storage layer based on a second layer, including steps of: (a) (i) on condition that a plurality of partial re-encryption keys generated from a re-encryption key have been recorded in a distributed manner in a plurality of PRE (proxy re-encryption) nodes included in the privacy layer in response to the re-encryption key being generated by using a second public key of the second user and a first private key of the first user through a first user terminal of the first user interlocked with the privacy layer according to data access request information from a second user terminal of the second user, wherein the re-encryption key is a key capable of converting a first encoded encryption key to be made by encoding an encryption key with a first public key of the first user into a second encoded encryption key to be made by encoding the encryption key with the second public key of the second user and (ii) on condition that (ii-1) subject data has been acquired, (ii-2) encoded subject data has been acquired by applying the encryption key to the subject data, and (ii-3) the first encoded encryption key has been generated by applying the first public key of the first user to the encryption key, through the first user terminal interlocked with the storage layer, acquiring, by a specific storage node included in the storage layer, the first encoded encryption key and the encoded subject data; and (b) in response to (i) the first encoded encryption key and the second public key being transmitted to the PRE nodes, (ii) second encoded encryption key pieces being generated by using the first encoded encryption key, the second public key, and a specific cardinal number of specific partial re-encryption keys recorded in specific PRE nodes among the PRE nodes, (iii) the second encoded encryption key pieces being transmitted to the second user terminal, (iv) the second encoded encryption key being generated from the second encoded encryption key pieces by the second user terminal, and (v) the encryption key being acquired by applying a second private key of the second user to the second encoded encryption key, instructing, by the specific storage node, the second user terminal to acquire the subject data by applying the encryption key to the encoded subject data transmitted to the second user terminal.

As one example, there is provided the method that, at the step of (a), the specific storage node (i) checks a certain cardinal number of necessary copies of the encoded subject data by referring to a file system contract, (ii) determines one or more specific other storage nodes, among other storage nodes which are storage nodes in the storage layer other than the specific storage node, to perform pinning of each of the necessary copies of the encoded subject data corresponding to the certain cardinal number of the necessary copies by referring to an agreement among the specific storage node and said other storage nodes, thereby instructing the specific other storage nodes to perform the pinning of the necessary copies of the encoded subject data, and (iii) transmits information on the specific storage node and the specific other storage nodes where the necessary copies of the encoded subject data are pinned to the file system contract, thereby instructing the file system contract to update the information on the specific storage node and the specific other storage nodes as location information where the necessary copies of the encoded subject data are pinned.

As one example, there is provided the method that, after the step of (a), in response to a detection of occurrence of loss of at least part of the necessary copies of the encoded subject data which have been pinned while monitoring the file system contract interlocked with the storage layer, the specific storage node (i) checks whether the encoded subject data has been pinned in a plurality of specific IPFS nodes through CIDs (Content Identifiers) corresponding to the encoded subject data, wherein the specific IPFS nodes belong to the specific storage node, (ii) in case the encoded subject data has not been pinned in the specific IPFS nodes, requests a specific watcher to verify the to the specific storage node, and performs monitoring of the file system contract, and (iii) in case a verification result for the encoded subject data is received from the specific watcher, instructs the specific IPFS nodes to pin the encoded subject data. As one example, there is provided the method that, at the step of (a), the specific storage node generates a plurality of partial encoded subject data by chunking the encoded subject data, records each of the partial encoded subject data in a plurality of specific IPFS nodes which belong to the specific storage node in a distributed manner, and updates CIDs for the encoded subject data and Peer IDs for specific other storage nodes in a specific DHT (Distributed Hash Table) corresponding to the specific IPFS nodes, wherein the specific other storage nodes represent some of storage nodes other than the specific storage node included in the storage layer and are able to perform an agreement with the specific storage node in relation to the encoded subject data.

As one example, there is provided the method that information on connection among the PRE nodes, the specific storage node and the specific other storage nodes is recorded and managed.

As one example, there is provided the method that, at the step of (b), in response to (i) access authority setting information of the second user for the subject data being transmitted to a policy contract interlocked with the PRE nodes by the first user terminal interlocked with the privacy layer, and (ii) source information to be used for verifying the second user terminal interlocked with the privacy layer as a rightful data requester for the subject data being checked to thereby verify the second user by the policy contract, the specific storage node transmits the encoded subject data and the first encoded encryption key to the second user terminal.

As one example, there is provided the method that the access authority setting information for the subject data contains at least part of information on the subject data, information on an accessible person, information on an accessible duration and information on a fee.

As one example, there is provided the method that, at the step of (a), the specific storage node (i) performs pinning of the encoded subject data and the first encoded encryption key corresponding thereto, (ii) checks a certain cardinal number of necessary copies of the encoded subject data by referring to the file system contract, and (iii) determines one or more specific other storage nodes, among other storage nodes which are storage nodes in the storage layer other than the specific storage node, to perform pinning of each of the necessary copies of the encoded subject data corresponding to the certain cardinal number of the necessary copies by referring to an agreement among the specific storage node and said other storage nodes, thereby instructing the specific other storage nodes to perform the pinning of the necessary copies of the encoded subject data and their corresponding copies of the first encoded encryption key.

As one example, there is provided the method that, at the step of (b), in response to acquiring an access request for the encoded subject data from the second user terminal, the specific storage node (i) transmits the first encoded encryption key and the encoded subject data to the second user terminal, (ii) instructs the second user terminal to transmit the first encoded encryption key and the second public key to each of the PRE nodes, (iii) instructs the PRE nodes to perform re-encryption to thereby generate each of the second encoded encryption key pieces by using the first encoded encryption key, the second public key and at least part of partial re-encryption keys recorded in each of the PRE nodes, and thus transmit each of the second encoded encryption key pieces to the second user terminal once it is generated each by each until an accumulated cardinal number of the second encoded encryption key pieces transmitted to the second user terminal becomes identical to the specific cardinal number, and (iv) generates the second encoded encryption key by combining each of transmitted specific second encoded encryption key pieces corresponding to the specific cardinal number.

As one example, there is provided the method that, at the step of (a), the specific storage node instructs the first user terminal to generate a random key as the encryption key for generating the encoded subject data and the first encoded encryption key.

In accordance with another aspect of the present disclosure, there is provided a specific storage node for providing a personal data storage service between a first user who is a data provider and a second user who is a data requester by using a smart contract based on a first layer and a privacy layer and a storage layer based on a second layer, including: at least one memory that stores instructions; and at least one processor configured to execute the instructions to perform or support another device to perform: (I) (i) on condition that a plurality of partial re-encryption keys generated from a re-encryption key have been recorded in a distributed manner in a plurality of PRE (proxy re-encryption) nodes included in the privacy layer in response to the re-encryption key being generated by using a second public key of the second user and a first private key of the first user through a first user terminal of the first user interlocked with the privacy layer according to data access request information from a second user terminal of the second user, wherein the re-encryption key is a key capable of converting a first encoded encryption key to be made by encoding an encryption key with a first public key of the first user into a second encoded encryption key to be made by encoding the encryption key with the second public key of the second user and (ii) on condition that (ii-1) subject data has been acquired, (ii-2) encoded subject data has been acquired by applying the encryption key to the subject data, and (ii-3) the first encoded encryption key has been generated by applying the first public key of the first user to the encryption key, through the first user terminal interlocked with the storage layer, a process of acquiring the first encoded encryption key and the encoded subject data; and (II) in response to (i) the first encoded encryption key and the second public key being transmitted to the PRE nodes, (ii) second encoded encryption key pieces being generated by using the first encoded encryption key, the second public key, and a specific cardinal number of specific partial re-encryption keys recorded in specific PRE nodes among the PRE nodes, (iii) the second encoded encryption key pieces being transmitted to the second user terminal, (iv) the second encoded encryption key being generated from the second encoded encryption key pieces by the second user terminal, and (v) the encryption key being acquired by applying a second private key of the second user to the second encoded encryption key, a process of instructing the second user terminal to acquire the subject data by applying the encryption key to the encoded subject data transmitted to the second user terminal.

As one example, there is provided the specific storage node that, at the process of (I), the specific storage node (i) checks a certain cardinal number of necessary copies of the encoded subject data by referring to a file system contract, (ii) determines one or more specific other storage nodes, among other storage nodes which are storage nodes in the storage layer other than the specific storage node, to perform pinning of each of the necessary copies of the encoded subject data corresponding to the certain cardinal number of the necessary copies by referring to an agreement among the specific storage node and said other storage nodes, thereby instructing the specific other storage nodes to perform the pinning of the necessary copies of the encoded subject data, and (iii) transmits information on the specific storage node and the specific other storage nodes where the necessary copies of the encoded subject data are pinned to the file system contract, thereby instructing the file system contract to update the information on the specific storage node and the specific other storage nodes as location information where the necessary copies of the encoded subject data are pinned.

As one example, there is provided the specific storage node that, after the process of (I), in response to a detection of occurrence of loss of at least part of the necessary copies of the encoded subject data which have been pinned while monitoring the file system contract interlocked with the storage layer, the specific storage node (i) checks whether the encoded subject data has been pinned in a plurality of specific IPFS nodes through CIDs (Content Identifiers) corresponding to the encoded subject data, wherein the specific IPFS nodes belong to the specific storage node, (ii) in case the encoded subject data has not been pinned in the specific IPFS nodes, requests a specific watcher to verify the encoded subject data, wherein the specific watcher corresponds to the specific storage node, and performs monitoring of the file system contract, and (iii) in case a verification result for the encoded subject data is received from the specific watcher, instructs the specific IPFS nodes to pin the encoded subject data.

As one example, there is provided the specific storage node that, at the process of (I), the specific storage node generates a plurality of partial encoded subject data by chunking the encoded subject data, records each of the partial encoded subject data in a plurality of specific IPFS nodes which belong to the specific storage node in a distributed manner, and updates CIDs for the encoded subject data and Peer IDs for specific other storage nodes in a specific DHT (Distributed Hash Table) corresponding to the specific IPFS nodes, wherein the specific other storage nodes represent some of storage nodes other than the specific storage node included in the storage layer and are able to perform an agreement with the specific storage node in relation to the encoded subject data.

As one example, there is provided the specific storage node that information on connection among the PRE nodes, the specific storage node and the specific other storage nodes is recorded and managed.

As one example, there is provided the specific storage node that, at the process of (II), in response to (i) access authority setting information of the second user for the subject data being transmitted to a policy contract interlocked with the PRE nodes by the first user terminal interlocked with the privacy layer, and (ii) source information to be used for verifying the second user terminal interlocked with the privacy layer as a rightful data requester for the subject data being checked to thereby verify the second user by the policy contract, the specific storage node transmits the encoded subject data and the first encoded encryption key to the second user terminal.

As one example, there is provided the specific storage node that the access authority setting information for the subject data contains at least part of information on the subject data, information on an accessible person, information on an accessible duration and information on a fee.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

FIG. 3A and FIG. 3B are drawings schematically respectively illustrating a process for pinning encoded subject data upon detecting a pinning event and a process for unpinning the encoded subject data upon detecting an unpinning event as a result of monitoring a smart contract in accordance with one example embodiment of the present disclosure.

DETAILED DESCRIPTION OF THE PREFERRED EMBODIMENTS

Figure 1:
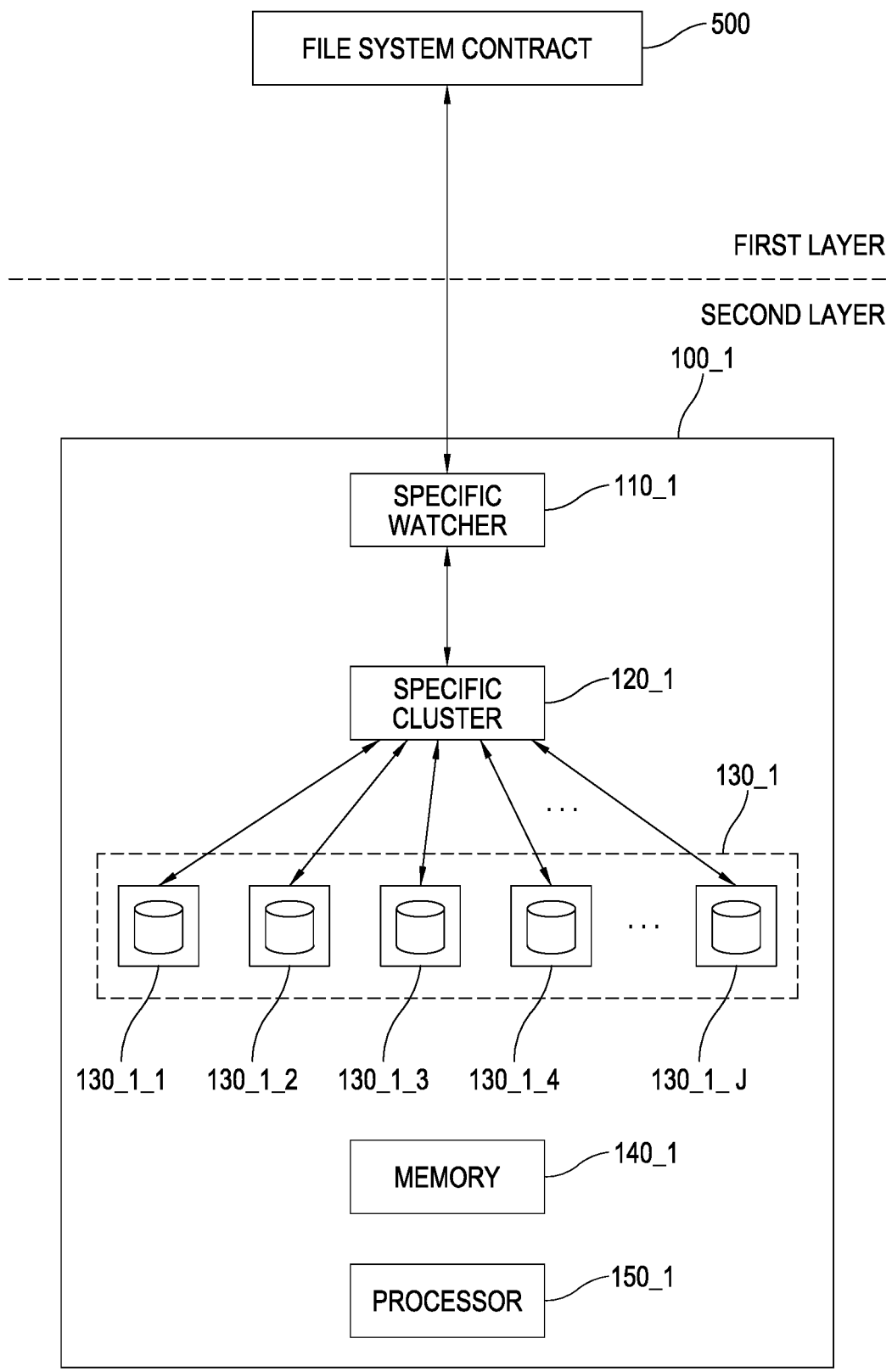
FIG. 1 is a drawing schematically illustrating a specific storage node for providing a personal data storage service between a first user who is a data provider and a second user who is a data requester by using a smart contract based on a first layer and a privacy layer and a storage layer based on a second layer in accordance with one example embodiment of the present disclosure.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

FIG. 1 is a drawing schematically illustrating a specific storage node for providing a personal data storage service between a first user who is a data provider and a second user who is a data requester by using a smart contract based on a first layer and a privacy layer and a storage layer based on a second layer in accordance with one example embodiment of the present disclosure.

Referring to FIG. 1, a specific storage node 100_1 located in the second layer may include a specific watcher 110_1, a specific cluster 120_1, a plurality of specific IPFS nodes 130_1, a memory 140_1 and a processor 150_1.

In addition, there is a file system contract 500 as a smart contract based on the first layer interlocked with the specific storage node 100_1, and the file system contract 500 may manage information on CIDs (Content Identifiers) corresponding to subject data stored in the specific storage node 100_1, information on a certain cardinal number of necessary copies for the subject data acquired from a first user terminal of the first user (for example, a minimum number of copies and/or a maximum number of copies) and information on pinning of the subject data.

Hereinafter, each of components of the specific storage node 100_1 shall be explained in detail.

Firstly, the specific watcher 110_1 may perform synchronization through communications with the file system contract 500 to thereby monitor the file system contract 500 in real time. Accordingly, the specific watcher 110_1 may check whether a pinning event related to the subject data has occurred.

An example of the pinning event is as follows.

For example, in response to detecting that a pinning state of the subject data is not maintained due to a failure of a part of a plurality of IPFS nodes in the specific storage node 100_1 and a plurality of IPFS nodes in other storage nodes (i.e., storage nodes other than the specific storage node) belonging to the storage layer based on the second layer, a situation of the failure is reported to the file system contract 500 as the pinning event through a certain watcher which belongs to a certain storage node having been failed, and accordingly the file system contract 500 is allowed to instruct another storage node to pin the subject therein, but it is not limited thereto. For reference, a plurality of specific IPFS nodes belonging to the specific storage node 100_1 are assumed to be in a normal state, i.e., a state without failure, and assumed to have not been pinned in a pinning process to be explained by using FIG. 3A below, and a plurality of specific IPFS nodes belonging to the specific storage node 100_1 are assumed to have been pinned in an unpinning process to be explained by using FIG. 3B below.

In addition, in response to detecting that the pinning event related to the subject data has occurred, the specific watcher 110_1 may transmit a command to perform the pinning process to a specific cluster 120_1.

Then, the specific cluster 120_1 may acquire the command related to the pinning event acquired from the specific watcher 110_1 and transmit the command to a plurality of specific IPFS nodes 130_1 to thereby instruct the plurality of specific IPFS nodes 130_1 to perform the pinning process. In this regard, it shall be explained in detail by referring to FIG. 3A and FIG. 3B.

Next, the plurality of specific IPFS nodes 130_1 may perform the pinning process, and then transmit a result of the pinning process to the specific cluster 120_1.

Herein, the plurality of specific IPFS nodes 130_1 may perform the pinning process not only when previously-pinned data is lost but also when the subject data is to be initially pinned at a request of the first user.

For example, in response to acquiring encoded subject data generated by applying the encryption key to the subject data through the first user terminal of the first user who is the data provider, the plurality of specific IPFS nodes 130_1 (i) generates a 1-st partial encoded subject data to a j-th partial encoded subject data by chunking the encoded subject data and records each of the 1-st partial encoded subject data to the j-th partial encoded subject data in each of a 1-st specific IPFS node 130_1_1 to a j-th specific IPFS node 130_1_j in a distributed manner, and (ii) records CIDs (i.e., Content Identifiers) related to the encoded subject data and Peer IDs related to specific other storage nodes in a specific DHT (i.e., Distributed Hash Table) corresponding to the specific IPFS nodes 130_1, wherein the specific other storage nodes represent some of storage nodes other than the specific storage node 100_1 included in the storage layer and are able to perform an agreement with the specific storage node 100_1 in relation to the encoded subject data, and j may be a natural number.

In addition, the specific storage node 100_1 may include a memory 140_1 that stores instructions for providing the personal data storage service between the first user who is the data provider and the second user who is the data requester by using the smart contract based on the first layer and the privacy layer and the storage layer based on the second layer, and a processor 150_1 configured to execute the instructions stored in the memory 140_1 for providing the personal data storage service between the first user who is the data provider and the second user who is the data requester by using the smart contract based on the first layer and the privacy layer and the storage layer based on the second layer.

Specifically, the specific storage node 100_1 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, a case in which the computing device includes an integrated processor, integrating a medium, a processor and a memory, for implementing the present disclosure is not excluded.

Figure 2:
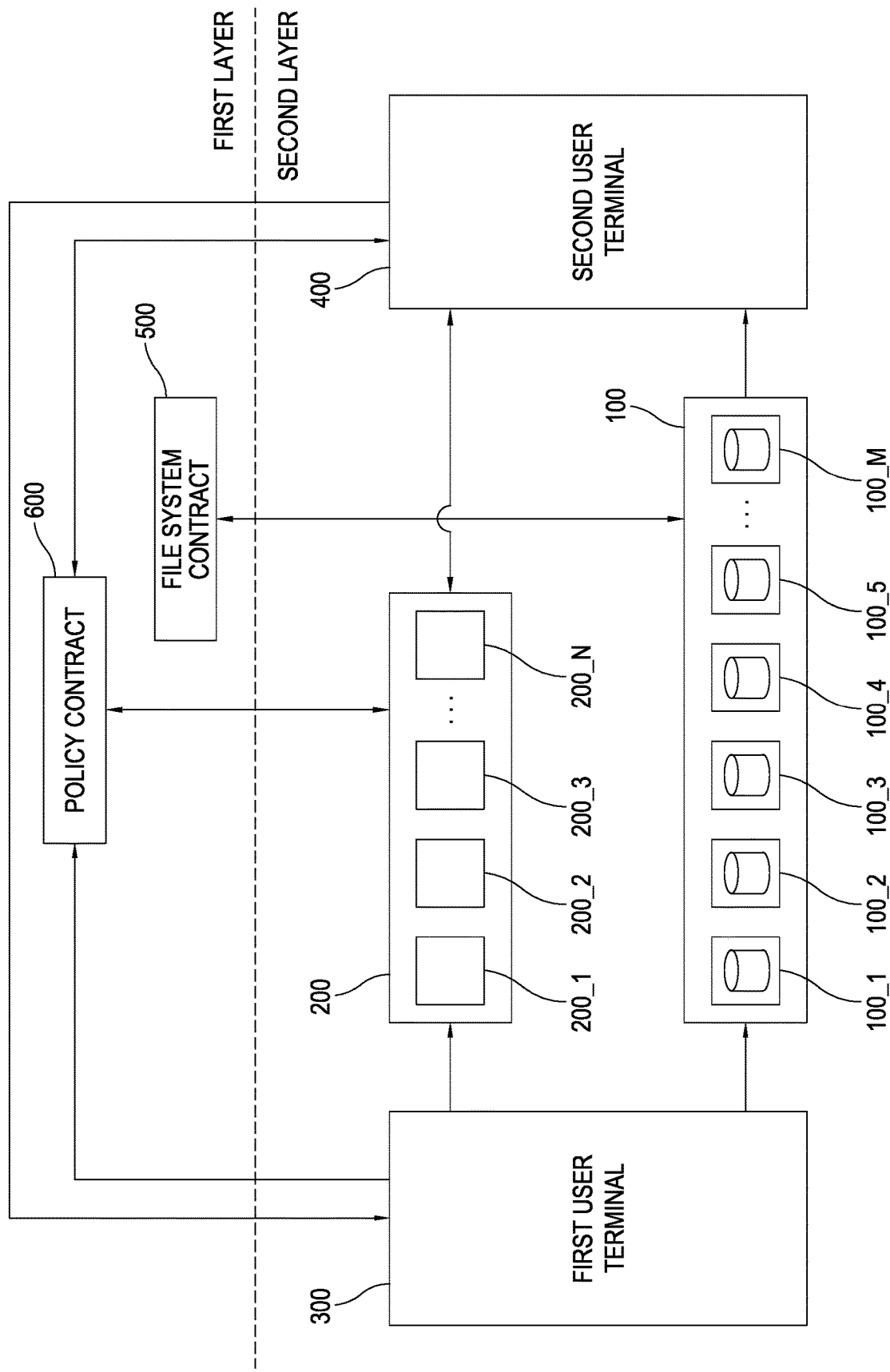
FIG. 2 is a drawing schematically illustrating a configuration of a system for providing the personal data storage service between the first user who is the data provider and the second user who is the data requester by using the smart contract based on the first layer and the privacy layer and the storage layer based on the second layer in accordance with one example embodiment of the present disclosure.

By including the specific storage node 100_1 as such, a system for providing the personal data storage service may be implemented, and this shall be specifically explained by referring to FIG. 2.

FIG. 2 is a drawing schematically illustrating a configuration of the system for providing the personal data storage service between the first user who is the data provider and the second user who is the data requester by using the smart contract based on the first layer and the privacy layer and the storage layer based on the second layer in accordance with one example embodiment of the present disclosure.

Referring to FIG. 2, the system for providing the personal data storage service may include (i) a storage layer 100 and a privacy layer 200 based on the second layer, and (ii) a file system contract 500 and a policy contract 600 that are smart contracts based on the first layer interlocked with each of the storage layer 100 and the privacy layer 200. Herein, the storage layer 100, the privacy layer 200, the file system contract 500 and the policy contract 600 may be directly or indirectly interlocked with a first user terminal 300 of the first user who is the data provider and a second user terminal 400 of the second user who is the data requester.

Firstly, the storage layer 100 includes a 1-st storage node 100_1 to an m-th storage node 100_m, and each of the 1-st storage node 100_1 to the m-th storage node 100_m may be a storage node of an identical configuration to the specific storage node 100_1 as explained in FIG. 1, but it is not limited thereto. Herein, for convenience, the 1-st storage node 100_1 may be regarded as the specific storage node 100_1, but it is not limited thereto. For example, the 1-st storage node 100_1 may be regarded as one of the 2-nd storage node 100_2 to the m-th storage node 100_m, as the case may be.

In addition, the file system contract 500 based on the first layer interlocked with the storage layer 100 is as explained in FIG. 1. Further, each of a 1-st watcher to an m-th watcher belonging to each of the 1-st storage node 100_1 to the m-th storage node 100_m may be instructed to monitor the file system contract 500 to thereby allow each of the 1-st watcher to the m-th watcher to detect an occurrence of the pinning event on the subject data simultaneously. That is, in response to detecting the pinning event on the subject data by each of the 1-st watcher to the m-th watcher, the 1-st storage node 100_1 to the m-th storage node 100_m may be allowed to attempt to perform the corresponding pinning process simultaneously.

Next, the privacy layer 200 includes n PRE (Proxy re-encryption) nodes, that is, a 1-st PRE node 200_1 to an n-th PRE node 200_n. Upon receiving a re-encryption key generated by the first user terminal 300, the privacy layer 200 may divide the re-encryption key to thereby generate each of plurality of partial re-encryption keys, and then record each of the plurality of partial re-encryption keys in each of the 1-st PRE node 200_1 to the n-th PRE node 200_n in a distributed manner. Thereafter, in response to a request for an access to the subject data from the second user terminal 400, the privacy layer 200 may apply at least part of the plurality of partial re-encryption keys to a first encoded encryption key to thereby generate a second encoded encryption key and then transmit the second encoded encryption key to the second user terminal 400 to thereby allow the second user terminal 400 to access the subject data. Herein, it shall be specifically explained as to the first encoded encryption key and the second encoded encryption key.

In addition, the policy contract 600 based on the first layer interlocked with the privacy layer 200 may acquire access authority setting information of the second user for the subject data from the first user terminal 300, and perform a verification by checking source information to be used for verifying the second user terminal as a rightful data requester for the subject data acquired from the second user terminal 400 based on the access authority setting information on the subject data. Then, in response to detecting that the second user is the rightful data requester, the policy contract 600 may transmit verification information on the second user to the privacy layer 200. Herein, the access authority setting information for the subject data may contain at least part of information on the subject data, information on an accessible person, information on an accessible duration and information on a fee, but it is not limited thereto.

Hereinbefore, the storage layer 100 and the privacy layer 200 have been explained as separate layers, but they are not limited thereto. As another example, the storage nodes and the PRE nodes may be implemented and operated as combined integrated nodes by mapping relationships between at least part of the 1-st storage node 100_1 to the m-th storage node 100_m and at least part of the 1-st PRE node 200_1 to the n-th PRE node 200_n. Herein, the relationships therebetween may be recorded and managed in a smart contract(s) corresponding to the combined integrated nodes, but they are not limited thereto.

In addition, it is omitted for the convenience of illustration, but in the first layer, other than the file system contract 500 and the policy contract 600 which are smart contracts, a membership function for recording and keeping information on a storage node manager(s) corresponding to each of the 1-st storage node 100_1 to the m-th storage node 100_m in the storage layer and information on users, e.g., information on the first user who is the data provider, information on the second user who is the data requester, etc. and an incentive function for providing remuneration to the storage node manager(s) corresponding to at least one storage node where the subject data is pinned may be further included, but it is not limited thereto.

As mentioned above, the first user terminal 300 is a terminal of the data provider. The first user terminal 300 may (i) generate the re-encryption key by using a second public key of the second user and a first private key of the first user according to data access request information for the subject data from the second user terminal of the second user who is the data requester, and transmit the re-encryption key to the privacy layer 200, (ii) generate an encryption key to be used for encoding the subject data, generate the encoded subject data by applying the encryption key to the subject data possessed by the first user, generate the first encoded encryption key by applying the first public key of the first user to the encryption key, and transmit the encoded subject data and the first encoded encryption key to the storage layer 100, and (iii) transmit the access authority setting information for the subject data of the second user to the policy contract 600. Herein, the re-encryption key means a key capable of converting the first encoded encryption key to be made by encoding the encryption key with the first public key of the first user into the second encoded encryption key to be made by encoding the encryption key with the second public key of the second user. Herein, "the second encoded encryption key to be made by encoding the encryption key with the second public key of the second user" does not represent a case of really applying the second public key to the encryption key but represents a case of being a same state as if the second public key has been applied to the encryption key (by a process of converting the first encoded encryption key to the second encoded encryption key through the re-encryption key). As to a process of making the state of the second encoded encryption key be the same as if the second public key has been applied to the encryption key shall be explained in detail later.

In addition, as mentioned above, the second user terminal 400 is a terminal of the data requester. The second user terminal 400 may transmit the data access request information for accessing the subject data possessed by the first user to the first user terminal 300, to thereby allow the first user terminal 300 to transmit the access authority setting information to the policy contract 600, and then in response to the second user terminal 400 receiving an access authority inquiry request from the policy contract 600, the second user terminal 400 may transmit the source information to be used for verifying the second user terminal as the rightful data requester for the subject data to the policy contract 600.

Thereafter, the second user terminal 400 may acquire the encoded subject data and the first encoded encryption key from the storage layer 100, and transmit the first encoded encryption key and the second public key of the second user to the privacy layer 200 to thereby allow the privacy layer 200 to generate second encoded encryption key pieces. Then, the second user terminal 400 may (i) acquire the second encoded encryption key by using the second encoded encryption key pieces, (ii) acquire the encryption key by decoding the second encoded encryption key with the second private key of the second user, and (iii) acquire the subject data by decoding the encoded subject data with the encryption key.

Meanwhile, a process for providing the public data storage service between the first user who is the data provider and the second user who is the data requester through the system configured as above shall be specifically explained.

Firstly, the second user who is the data requester may transmit the data access request information containing the second public key of the second user in order to access the subject data possessed by the first user through the second user terminal 400.

Then, the first user may (i) check the data access request information through the first user terminal 300, (ii) generate the re-encryption key by using the second public key of the second user and the first private key of the first user, and then transmit the re-encryption key to the privacy layer 200, (iii) generate an encryption key capable of encoding data by a predetermined algorithm, and then generate the encoded subject data having a state of being encoded by applying the encryption key to the subject data in possession of the first user, and (iv) generate the first encoded encryption key having a state as if it is acquired by applying the first public key of the first user to the encryption key, and then transmit the encoded subject data and the first encoded encryption key to the storage layer 100. Herein, the encryption key to be used for generating the first encoded encryption key may be generated as a random key, but it is not limited thereto. Herein, the method for generating the re-encryption key is shown in NuCypher whitebook, and thus the detailed explanation thereon shall be omitted.

In the above, it has been explained that the re-encryption key is firstly transmitted to the privacy layer 200, and then the encoded subject data and the first encoded encryption key are transmitted to the storage layer 100, it is not limited thereto. As another example, the encoded subject data and the first encoded encryption key may be transmitted to the storage layer 100 and then the re-encryption key may be allowed to be transmitted to the privacy layer 200, or the two processes may be performed simultaneously.

Thereafter, in the privacy layer 200, the plurality of partial re-encryption keys divided from the re-encryption key acquired from the first user terminal 300 are generated, and each of the plurality of partial re-encryption keys is recorded in a distributed manner in each of the 1-th PRE node 200_1 to the n-th PRE node 200_n. Further, in the storage layer 100, upon detecting that the encoded subject data has been acquired from the first user terminal 300, each of the specific storage node 100_1 and the other storage nodes 100_2 to 100_m may (i) check a certain cardinal number of necessary copies of the encoded subject data by referring to the file system contract 500, (ii) determine one or more specific other storage nodes among other storage nodes which are storage nodes in the storage layer 100 other than the specific storage node 100_1, to perform pinning of each of the necessary copies of the encoded subject data corresponding to the certain cardinal number of the necessary copies by referring to an agreement among the specific storage node 100_1 and said other storage nodes 100_2 and 100_m, thereby instructing the specific other storage nodes to perform the pinning of the necessary copies of the encoded subject data, and (iii) transmit information on the specific other storage nodes which has performed the pinning of the necessary copies of the encoded subject data to the file system contract 500, thereby instructing the file system contract 500 to update the information thereon.

As one example, assuming that the number of the storage nodes contained in the storage layer 100 is five, and the number of the necessary copies on the encoded subject data is recognized as three through the file system contract 500, the 1-st storage node 100_1 (i.e., the specific storage node) and the 2-nd storage node 100_2 to the 5-th storage node 100_5 (i.e., said other storage nodes) may perform an agreement with one another to select the 1-st storage node 100_1, the 2-nd storage node 100_2 and the 4-th storage node 100_4 as the three storage nodes for pinning the three copies of the encoded subject data, but it is not limited thereto.

In addition, in response to selecting each of the 1-st storage node 100_1, the 2-nd storage node 100_2 and the 4-th storage node 100_4 as the three storage nodes for pinning the three copies of the encoded subject data, each of the 1-st storage node 100_1, the 2-nd storage node 100_2 and the 4-th storage node 100_4 may perform the pinning of the three copies of the encoded subject data, and may transmit information on the specific storage node 100_1, the 2-nd storage node 100_2 and the 4-th storage node 100_4 having pinned the three copies of the encoded subject data to the file system contract 500, thereby instructing the file system contract 500 to update the information on the pinning state related to the three copies of the encoded subject data.

In addition, each of the specific storage node 100_1, the 2-nd storage node 100_2 and the 4-th storage node 100_4 generates a plurality of copies of partial encoded subject data divided from each of the three copies of the encoded subject data and records each of the plurality of copies of the partial encoded subject data in each of the plurality of IPFS nodes which belong to each of the specific storage node 100_1, the 2-nd storage node 100_2 and the 4-th storage 100_4 in a distributed manner.

Herein, the process of recording each of the plurality of partial re-encryption keys in each of the 1-st PRE node 200_1 to the n-th PRE node 200_n and the process of recording each of the plurality of copies of the partial encoded subject data in the plurality of IPFS nodes which belong to the storage node determined by the agreement may be performed simultaneously, or may be performed sequentially, but it is not limited thereto.

In addition, upon detecting that each of the plurality of copies of the partial encoded subject data is recorded in the plurality of IPFS nodes in a distributed manner, each of the storage nodes may update CIDs for the encoded subject data and Peer IDs for specific other storage nodes in a specific DHT (Distributed Hash Table) corresponding to the specific IPFS nodes, wherein the specific other storage nodes represent some of storage nodes (other than the specific storage node 100_1) included in the other storage nodes 100_2 to 100_m and are able to perform an agreement with the specific storage node 100_1 in relation to the encoded subject data.

In addition, certain storage nodes (e.g., the 1-st storage node 100_1, the 2-nd storage node 100_2 and the 4-th storage node 100_4 according to the example above) having pinned the copies of the encoded subject data among the specific storage node 100_1 and the other storage nodes 100_2 to 100_m may also perform pinning of copies of the first encoded encryption key corresponding to the copies of the encoded subject data. When performing the pinning of the copies of the first encoded encryption key, depending on the case, the certain storage nodes may divide the copies of the first encoded encryption key to thereby generate copies of partial first encoded encryption keys and record the copies of the partial first encoded encryption keys in each of the plurality of IPFS nodes which belong to each of the certain storage nodes in a distributed manner.

Meanwhile, on condition that the copies of the encoded subject data and the copies of the first encoded encryption key have been pinned in the specific storage node 100_1 and the specific other storage nodes, in response to detecting an occurrence of a pinning event or an unpinning event while monitoring the file system contract 500, each of the specific storage node 100_1 and the specific storage nodes 100_2 to 100_m may perform a pinning process or an unpinning process corresponding to the pinning event or the unpinning event, and this shall be explained by referring to FIG. 3A and FIG. 3B.

FIG. 3A and FIG. 3B are drawings schematically respectively illustrating a process for pinning the encoded subject data upon detecting the pinning event and a process for unpinning the encoded subject data upon detecting the unpinning event as a result of monitoring a smart contract in accordance with one example embodiment of the present disclosure.

Referring to FIG. 3A, the specific watcher 110_1 which belongs to the specific storage node 100_1 may detect the pinning event representing that pinning is necessary due to an occurrence of a problem such as loss of at least part of the encoded subject data having been pinned, while monitoring the file system contract 500 in real time, at a step of S1.

In response to detecting the pinning event, the specific watcher 110_1 may transmit a pinning request for the encoded subject data as a pinning command to the specific cluster 120_1 at a step of S2, and the specific cluster 120_1 may transmit the request for checking whether the encoded subject data has been pinned to the plurality of specific IPFS nodes 130_1 according to the pinning request for the encoded subject data at a step of S3. Then, after checking whether the encoded subject data has been pinned therein, the plurality of specific IPFS nodes 130_1 may transmit information thereon to the specific cluster 120_1 at a step of S4.

In case the specific cluster 120_1 detects that the encoded subject data has been pinned in the plurality of specific IPFS nodes 130_1, the specific cluster 120_1 may transmit a result of checking to the file system contract 500 through the specific watcher 100_1 and then terminate the pinning process on the encoded subject data without performing the pinning process on the encoded subject data.

In contrast, in case the specific cluster 120_1 detects that at least part of the encoded subject data pinned has been lost, the specific cluster 120_1 may request a verification on the encoded subject data to the specific watcher 110_1 at a step of S5, the specific watcher 110_1 may perform the verification on the encoded subject data at a step of S6, and the specific watcher 110_1 may transmit a result of the verification on the encoded subject data to the specific cluster 120_1 at a step of S7.

That is, the pinning process on the encoded subject data is performed only in case the encoded subject data is verified as the right data to be pinned.

Accordingly, upon the completion of the verification for the encoded subject data, the specific cluster 120_1 may request performing the pinning process for the encoded subject data to the plurality of specific IPFS nodes 130_1 at a step of S8, and then the plurality of specific IPFS nodes 130_1 may pin the encoded subject data at a step of S9.

Herein, the specific cluster 120_1 may acquire the copies of the encoded subject data from at least one of the specific other storage nodes that perform an agreement with the specific storage node 100_1, but it is not limited thereto.

Thereafter, the plurality of specific IPFS nodes 130_1 may transmit a pinning result to the specific cluster 120_1 after completing the pinning process for the encoded subject data at a step of S10, the specific cluster 120_1 may transmit the pinning result to the specific watcher 110_1 at a step of S11, and then the specific watcher 110_1 may transmit the pinning result to the file system contract 500 at a step of S12 to thereby update the pinning result for the pinning event.

Meanwhile, referring to FIG. 3B, the specific watcher 110_1 which belongs to the specific storage node 100_1 may detect the unpinning event representing that unpinning should be performed by partly releasing the pinning state of the encoded subject data pinned, while monitoring the file system contract 500 in real time, at a step of S21.

In response to detecting the unpinning event, the specific watcher 110_1 may transmit a unpinning request for the encoded subject data as an unpinning command to the specific cluster 120_1 at a step of S22, and the specific cluster 120_1 may transmit the request for checking whether the encoded subject data has been pinned to the plurality of specific IPFS nodes 130_1 according to the unpinning request for the encoded subject data at a step of S23. Then, after checking whether the encoded subject data has been pinned therein, the plurality of specific IPFS nodes 130_1 may transmit information thereon to the specific cluster 120_1 at a step of S24.

In case the specific cluster 120_1 detects that the encoded subject data has not been pinned in the plurality of specific IPFS nodes 130_1, since there is no need to unpin the encoded subject data, the specific cluster 120_1 may transmit a result of checking to the file system contract 500 through the specific watcher 100_1 and then terminate the unpinning process on the encoded subject data.

In contrast, in case the specific cluster 120_1 detects that at least part of the encoded subject data has been pinned, the specific cluster 120_1 may request a verification on the encoded subject data to the specific watcher 110_1 at a step of S25, the specific watcher 110_1 may perform the verification on the encoded subject data at a step of S26, and the specific watcher 110_1 may transmit a result of the verification on the encoded subject data to the specific cluster 120_1 at a step of S27.

For example, only in case the specific watcher 110_1 verifies the encoded subject data as the right data to be unpinned, the unpinning process on the encoded subject data may be performed.

Accordingly, in response to completing the verification for the encoded subject data, the specific cluster 120_1 may request performing the unpinning process for the encoded subject data to the plurality of specific IPFS nodes 130_1 at a step of S28, and the plurality of the specific IPFS nodes 130_1 may unpin the encoded subject data at a step of S29.

Thereafter, the plurality of specific IPFS nodes 130_1 may transmit an unpinning result to the specific cluster 120_1 after completing the unpinning process for the encoded subject data at a step of S30, the specific cluster 120_1 may transmit the unpinning result to the specific watcher 110_1 at a step of S31, and then the specific watcher 110_1 may transmit the unpinning result to the file system contract 500 at a step of S32 to thereby update the unpinning result for the unpinning event.

For reference, it has been explained that the processes of FIGS. 3A and 3B are performed only at the specific storage node 100_1, but it is not limited thereto. As another example, at least one of the other storage nodes 100_2 to 100_m contained in the storage layer 100 may also perform the same processes simultaneously. In addition, in FIG. 3A and FIG. 3B, it has been explained as to the pinning process and the unpinning process for the encoded subject data, but it is not limited thereto. For example, the pinning process and the unpinning process for the first encoded encryption key may also be performed.

Referring to FIG. 2 again, on condition that the copies of the encoded subject data and the copies of the first encoded encryption key have been pinned in some storage nodes among the specific storage node 100_1 and the other storage nodes 100_2 to 100_m, the policy contract 600 may perform a verification on the second user who is the data requester to thereby determine whether the second user can access the subject data.

As one example, the first user who is the data provider may transmit the access authority setting information of the second user for the subject data to the policy contract 600 interlocked with the privacy layer 200 through the first user terminal 300. Herein, the access authority setting information of the second user for the subject data contains at least part of information on the subject data, information on an accessible person, information on an accessible duration and information on a fee, but it is not limited thereto.

Thereafter, the policy contract 600 may request necessary information to be used for verification to the second user terminal 400 in order to perform a verification on the second user based on the access authority setting information of the second user for the subject data, and acquire source information to be used for verifying the second user as the rightful data requester for the subject data from the second user terminal 400.

Then, the policy contract 600 may transmit the verification information of the second user for the subject data to the privacy layer 200 when the second user is determined as a rightful data requester who can access the subject data by verifying the source information for the subject data. Thereafter, (i) the first encoded encryption key and the second public key are transmitted to the 1-st PRE node 200_1 to the n-th PRE node 200_n contained in the privacy layer 200, (ii) the second encoded encryption key pieces are generated by using the first encoded encryption key, the second public key, and a specific cardinal number of specific partial re-encryption keys recorded in specific PRE nodes among the PRE nodes, (iii) the second encoded encryption key pieces are transmitted to the second user terminal 400, and (iv) the second encoded encryption key are generated from the second encoded encryption key pieces by the second user terminal 400. Herein, the specific cardinal number serves as a threshold number. For example, assuming that the number of the PRE nodes is 10 and the specific cardinal number serving as the threshold number is 7, 7 specific partial re-encryption keys can be acquired at 7 specific PRE nodes among the 10 PRE nodes and then 7 second encoded encryption key pieces can be generated by using the first encoded encryption key, the second public key, and the 7 specific partial re-encryption keys.

For example, the specific storage node 100_1 may transmit the first encoded encryption key and the encoded subject data to the second user terminal 400, and instruct the second user terminal 400 to transmit the first encoded encryption key and the second public key to each of the 1-st PRE node 200_1 to the n-th PRE node 200_n. In addition, in response to transmitting the 1-st encoded encryption key and the second public key to the 1-st PRE node 200_1 to the n-th PRE node 200_n, each of the 1-st PRE node 200_1 to the n-th PRE node 200_n may perform re-encryption by using the first encoded encryption key, the second public key, and each of the partial re-encryption keys recorded in each of the 1-st PRE node 200_1 to the n-th PRE node 200_n, to thereby generate each of the second encoded encryption key pieces.

In addition, each of the 1-st PRE node 200_1 to the n-th PRE node 200_n may transmit each of the second encoded encryption key pieces to the second user terminal 400 once it is generated each by each until an accumulated cardinal number of the second encoded encryption key pieces transmitted to the second user terminal 400 becomes identical to the specific cardinal number, and in response to determining that the accumulated cardinal number of the second encoded encryption key pieces received at the second user terminal 400 becomes identical to the specific cardinal number, the second user terminal 400 may generate the second encoded encryption key by combining each of the received second encoded encryption key pieces corresponding to the specific cardinal number.

As one example, in case there are the 1-st PRE node 200_1 to the 10-th PRE node in the privacy layer 200, and in case the specific cardinal number (serving as the threshold number) of the specific partial re-encryption keys which is required for generating the second encoded encryption key is 7, each second encoded encryption key piece is transmitted from each PRE node to the second user terminal 400 in the order of generating each corresponding second encoded encryption key piece among the 1-st PRE node 200_1 to the 10-th PRE node. When the specific cardinal number of the second encoded encryption key pieces received at the second user terminal 400 is determined as 7 in total, the second user terminal 400 may be instructed to generate the second encoded encryption key by combining the 7 second encoded encryption key pieces. Generalizing this, the second user terminal 400 may allow to sequentially acquire k second encoded encryption key pieces from k PRE nodes among the 1-st PRE node 200_1 to the n-th PRE node 200_n, wherein k is an integer 1 or more and n or less as a cardinal number. This is to consider a possibility of not acquiring some of the second encoded encryption key pieces due to a problem occurring in at least part of the 1-st PRE node 200_1 to the n-th PRE node 200_n, but it is not limited thereto.

That is, the process of making the state of the second encoded encryption key be the same as if the second public key has been applied to the encryption key is performed as mentioned above.

In addition, in response to detecting that the second user has acquired the second encoded encryption key through the second user terminal 400, the encryption key may be allowed to be acquired by decoding the second encoded encryption key with the second private key of the second user.

Thereafter, the second user may be instructed to finally acquire the subject data by decoding the encoded subject data with the encryption key at the second user terminal 400.

Accordingly, in case the system of the present disclosure is used, even if the second user who is the data requester does not disclose his or her own private key, the second user may be allowed to acquire the subject data by decoding the encoded subject data, and even if the previously-pinned encoded subject data is lost in at least part of storage nodes in the storage layer 100, some storage nodes can be selected among all the storage nodes to pin one or more copies of the encoded subject data by an agreement among the specific storage node 100_1 and said other storage nodes, thereby securing data availability, and even if the number of the data requesters increases, it is not necessary to generate and store each of its corresponding encoded encryption keys and each of its corresponding encoded subject data for each of the data requesters, and thus even without an expansion of storage space of the existing storage nodes 100_1 to 100_m in the storage layer 100, it can be efficiently operated.

The present disclosure has an effect of generating the encoded subject data by encoding the subject data with the random key serving as the encryption key generated through the data provider terminal, to thereby prevent the personal storage service provider from decoding the encoded subject data.

The present disclosure has another effect of saving a storage for use in the PDS service since there is no need to generate each of the encoded encryption keys and each of the encoded subject data for each of the data requesters by using the proxy re-encryption technology even if the number of the data requesters increases.

The present disclosure has still another effect of securing an availability of the subject data even if a problem occurs in some storage node(s) by recording each of copies of the encoded subject data in each of the storage nodes included in the storage layer and then by instructing each of the storage nodes to record each of the copies of the encoded subject data in a distributed manner by chunking.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a personal data storage service between a first user who is a data provider and a second user who is a data requester by using a smart contract based on a first layer and a privacy layer and a storage layer based on a second layer, comprising steps of:

(a) (i) on condition that a plurality of partial re-encryption keys generated from a re-encryption key have been recorded in a distributed manner in a plurality of PRE (proxy re-encryption) nodes included in the privacy layer in response to the re-encryption key being generated by using a second public key of the second user and a first private key of the first user through a first user terminal of the first user interlocked with the privacy layer according to data access request information from a second user terminal of the second user, wherein the re-encryption key is a key capable of converting a first encoded encryption key to be made by encoding an encryption key with a first public key of the first user into a second encoded encryption key to be made by encoding the encryption key with the second public key of the second user and (ii) on condition that (ii-1) subject data has been acquired, (ii-2) encoded subject data has been acquired by applying the encryption key to the subject data, and (ii-3) the first encoded encryption key has been generated by applying the first public key of the first user to the encryption key, through the first user terminal interlocked with the storage layer, acquiring, by a specific storage node included in the storage layer, the first encoded encryption key and the encoded subject data; and (b) in response to (i) the first encoded encryption key and the second public key being transmitted to the PRE nodes, (ii) second encoded encryption key pieces being generated by using the first encoded encryption key, the second public key, and a specific cardinal number of specific partial re-encryption keys recorded in specific PRE nodes among the PRE nodes, (iii) the second encoded encryption key pieces being transmitted to the second user terminal, (iv) the second encoded encryption key being generated from the second encoded encryption key pieces by the second user terminal, and (v) the encryption key being acquired by applying a second private key of the second user to the second encoded encryption key, instructing, by the specific storage node, the second user terminal to acquire the subject data by applying the encryption key to the encoded subject data transmitted to the second user terminal.

2. The method of claim 1, wherein, at the step of (a), the specific storage node (i) checks a certain cardinal number of necessary copies of the encoded subject data by referring to a file system contract, (ii) determines one or more specific other storage nodes, among other storage nodes which are storage nodes in the storage layer other than the specific storage node, to perform pinning of each of the necessary copies of the encoded subject data corresponding to the certain cardinal number of the necessary copies by referring to an agreement among the specific storage node and said other storage nodes, thereby instructing the specific other storage nodes to perform the pinning of the necessary copies of the encoded subject data, and (iii) transmits information on the specific storage node and the specific other storage nodes where the necessary copies of the encoded subject data are pinned to the file system contract, thereby instructing the file system contract to update the information on the specific storage node and the specific other storage nodes as location information where the necessary copies of the encoded subject data are pinned.

3. The method of claim 2, wherein, after the step of (a), in response to a detection of occurrence of loss of at least part of the necessary copies of the encoded subject data which have been pinned while monitoring the file system contract interlocked with the storage layer, the specific storage node (i) checks whether the encoded subject data has been pinned in a plurality of specific IPFS nodes through CIDs (Content Identifiers) corresponding to the encoded subject data, wherein the specific IPFS nodes belong to the specific storage node, (ii) in case the encoded subject data has not been pinned in the specific IPFS nodes, requests a specific watcher to verify the encoded subject data, wherein the specific watcher corresponds to the specific storage node, and performs monitoring of the file system contract, and (iii) in case a verification result for the encoded subject data is received from the specific watcher, instructs the specific IPFS nodes to pin the encoded subject data.

4. The method of claim 1, wherein, at the step of (a), the specific storage node generates a plurality of partial encoded subject data by chunking the encoded subject data, records each of the partial encoded subject data in a plurality of specific IPFS nodes which belong to the specific storage node in a distributed manner, and updates CIDs for the encoded subject data and Peer IDs for specific other storage nodes in a specific DHT (Distributed Hash Table) corresponding to the specific IPFS nodes, wherein the specific other storage nodes represent some of storage nodes other than the specific storage node included in the storage layer and are able to perform an agreement with the specific storage node in relation to the encoded subject data.

5. The method of claim 4, wherein information on connection among the PRE nodes, the specific storage node and the specific other storage nodes is recorded and managed.

6. The method of claim 1, wherein, at the step of (b), in response to (i) access authority setting information of the second user for the subject data being transmitted to a policy contract interlocked with the PRE nodes by the first user terminal interlocked with the privacy layer, and (ii) source information to be used for verifying the second user terminal interlocked with the privacy layer as a rightful data requester for the subject data being checked to thereby verify the second user by the policy contract, the specific storage node transmits the encoded subject data and the first encoded encryption key to the second user terminal.

7. The method of claim 6, wherein the access authority setting information for the subject data contains at least part of information on the subject data, information on an accessible person, information on an accessible duration and information on a fee.

8. The method of claim 2, wherein, at the step of (a), the specific storage node (i) performs pinning of the encoded subject data and the first encoded encryption key corresponding thereto, (ii) checks a certain cardinal number of necessary copies of the encoded subject data by referring to the file system contract, and (iii) determines one or more specific other storage nodes, among other storage nodes which are storage nodes in the storage layer other than the specific storage node, to perform pinning of each of the necessary copies of the encoded subject data corresponding to the certain cardinal number of the necessary copies by referring to an agreement among the specific storage node and said other storage nodes, thereby instructing the specific other storage nodes to perform the pinning of the necessary copies of the encoded subject data and their corresponding copies of the first encoded encryption key.

9. The method of claim 1, wherein, at the step of (b), in response to acquiring an access request for the encoded subject data from the second user terminal, the specific storage node (i) transmits the first encoded encryption key and the encoded subject data to the second user terminal, (ii) instructs the second user terminal to transmit the first encoded encryption key and the second public key to each of the PRE nodes, (iii) instructs the PRE nodes to perform re-encryption to thereby generate each of the second encoded encryption key pieces by using the first encoded encryption key, the second public key and at least part of partial re-encryption keys recorded in each of the PRE nodes, and thus transmit each of the second encoded encryption key pieces to the second user terminal once it is generated each by each until an accumulated cardinal number of the second encoded encryption key pieces transmitted to the second user terminal becomes identical to the specific cardinal number, and (iv) generates the second encoded encryption key by combining each of transmitted specific second encoded encryption key pieces corresponding to the specific cardinal number.

10. The method of claim 1, wherein, at the step of (a), the specific storage node instructs the first user terminal to generate a random key as the encryption key for generating the encoded subject data and the first encoded encryption key.

11. A specific storage node for providing a personal data storage service between a first user who is a data provider and a second user who is a data requester by using a smart contract based on a first layer and a privacy layer and a storage layer based on a second layer, comprising:
at least one memory that stores instructions; and
at least one processor configured to execute the instructions to perform or support another device to perform: (I) (i) on condition that a plurality of partial re-encryption keys generated from a re-encryption key have been recorded in a distributed manner in a plurality of PRE (proxy re-encryption) nodes included in the privacy layer in response to the re-encryption key being generated by using a second public key of the second user and a first private key of the first user through a first user terminal of the first user interlocked with the privacy layer according to data access request information from a second user terminal of the second user, wherein the re-encryption key is a key capable of converting a first encoded encryption key to be made by encoding an encryption key with a first public key of the first user into a second encoded encryption key to be made by encoding the encryption key with the second public key of the second user and (ii) on condition that (ii-1) subject data has been acquired, (ii-2) encoded subject data has been acquired by applying the encryption key to the subject data, and (ii-3) the first encoded encryption key has been generated by applying the first public key of the first user to the encryption key, through the first user terminal interlocked with the storage layer, a process of acquiring the first encoded encryption key and the encoded subject data; and (II) in response to (i) the first encoded encryption key and the second public key being transmitted to the PRE nodes, (ii) second encoded encryption key pieces being generated by using the first encoded encryption key, the second public key, and a specific cardinal number of specific partial re-encryption keys recorded in specific PRE nodes among the PRE nodes, (iii) the second encoded encryption key pieces being transmitted to the second user terminal, (iv) the second encoded encryption key being generated from the second encoded encryption key pieces by the second user terminal, and (v) the encryption key being acquired by applying a second private key of the second user to the second encoded encryption key, a process of instructing the second user terminal to acquire the subject data by applying the encryption key to the encoded subject data transmitted to the second user terminal.

12. The specific storage node of claim 11, wherein, at the process of (I), the specific storage node (i) checks a certain cardinal number of necessary copies of the encoded subject data by referring to a file system contract, (ii) determines one or more specific other storage nodes, among other storage nodes which are storage nodes in the storage layer other than the specific storage node, to perform pinning of each of the necessary copies of the encoded subject data corresponding to the certain cardinal number of the necessary copies by referring to an agreement among the specific storage node and said other storage nodes, thereby instructing the specific other storage nodes to perform the pinning of the necessary copies of the encoded subject data, and (iii) transmits information on the specific storage node and the specific other storage nodes where the necessary copies of the encoded subject data are pinned to the file system contract, thereby instructing the file system contract to update the information on the specific storage node and the specific other storage nodes as location information where the necessary copies of the encoded subject data are pinned.

13. The specific storage node of claim 12, wherein, after the process of (I), in response to a detection of occurrence of loss of at least part of the necessary copies of the encoded subject data which have been pinned while monitoring the file system contract interlocked with the storage layer, the specific storage node (i) checks whether the encoded subject data has been pinned in a plurality of specific IPFS nodes through CIDs (Content Identifiers) corresponding to the encoded subject data, wherein the specific IPFS nodes belong to the specific storage node, (ii) in case the encoded subject data has not been pinned in the specific IPFS nodes, requests a specific watcher to verify the to the specific storage node, and performs monitoring of the file system contract, and (iii) in case a verification result for the encoded subject data is received from the specific watcher, instructs the specific IPFS nodes to pin the encoded subject data.

14. The specific storage node of claim 11, wherein, at the process of (I), the specific storage node generates a plurality of partial encoded subject data by chunking the encoded subject data, records each of the partial encoded subject data in a plurality of specific IPFS nodes which belong to the specific storage node in a distributed manner, and updates CIDs for the encoded subject data and Peer IDs for specific other storage nodes in a specific DHT (Distributed Hash Table) corresponding to the specific IPFS nodes, wherein the specific other storage nodes represent some of storage nodes other than the specific storage node included in the storage layer and are able to perform an agreement with the specific storage node in relation to the encoded subject data.

15. The specific storage node of claim 14, wherein information on connection among the PRE nodes, the specific storage node and the specific other storage nodes is recorded and managed.

16. The specific storage node of claim 11, wherein, at the process of (II), in response to (i) access authority setting information of the second user for the subject data being transmitted to a policy contract interlocked with the PRE nodes by the first user terminal interlocked with the privacy layer, and (ii) source information to be used for verifying the second user terminal interlocked with the privacy layer as a rightful data requester for the subject data being checked to thereby verify the second user by the policy contract, the specific storage node transmits the encoded subject data and the first encoded encryption key to the second user terminal.

17. The specific storage node of claim 16, wherein the access authority setting information for the subject data contains at least part of information on the subject data, information on an accessible person, information on an accessible duration and information on a fee.

18. The specific storage node of claim 12, wherein, at the process of (I), the specific storage node (i) performs pinning of the encoded subject data and the first encoded encryption key corresponding thereto, (ii) checks a certain cardinal number of necessary copies of the encoded subject data by referring to the file system contract, and (iii) determines one or more specific other storage nodes, among other storage nodes which are storage nodes in the storage layer other than the specific storage node, to perform pinning of each of the necessary copies of the encoded subject data corresponding to the certain cardinal number of the necessary copies by referring to an agreement among the specific storage node and said other storage nodes, thereby instructing the specific other storage nodes to perform the pinning of the necessary copies of the encoded subject data and their corresponding copies of the first encoded encryption key.

19. The specific storage node of claim 12, wherein, at the process of (II), in response to acquiring an access request for the encoded subject data from the second user terminal, the specific storage node (i) transmits the first encoded encryption key and the encoded subject data to the second user terminal, (ii) instructs the second user terminal to transmit the first encoded encryption key and the second public key to each of the PRE nodes, (iii) instructs the PRE nodes to perform re-encryption to thereby generate each of the second encoded encryption key pieces by using the first encoded encryption key, the second public key and at least part of partial re-encryption keys recorded in each of the PRE nodes, and thus transmit each of the second encoded encryption key pieces to the second user terminal once it is generated each by each until an accumulated cardinal number of the second encoded encryption key pieces transmitted to the second user terminal becomes identical to the specific cardinal number, and (iv) generates the second encoded encryption key by combining each of transmitted specific second encoded encryption key pieces corresponding to the specific cardinal number.

20. The specific storage node of claim 11, wherein, at the process of (I), the specific storage node instructs the first user terminal to generate a random key as the encryption key for generating the encoded subject data and the first encoded encryption key.

* * * * *